June 8, 1943.　　　R. E. OLSON　　　2,321,235
PASTEURIZING SYSTEMS
Filed March 7, 1941
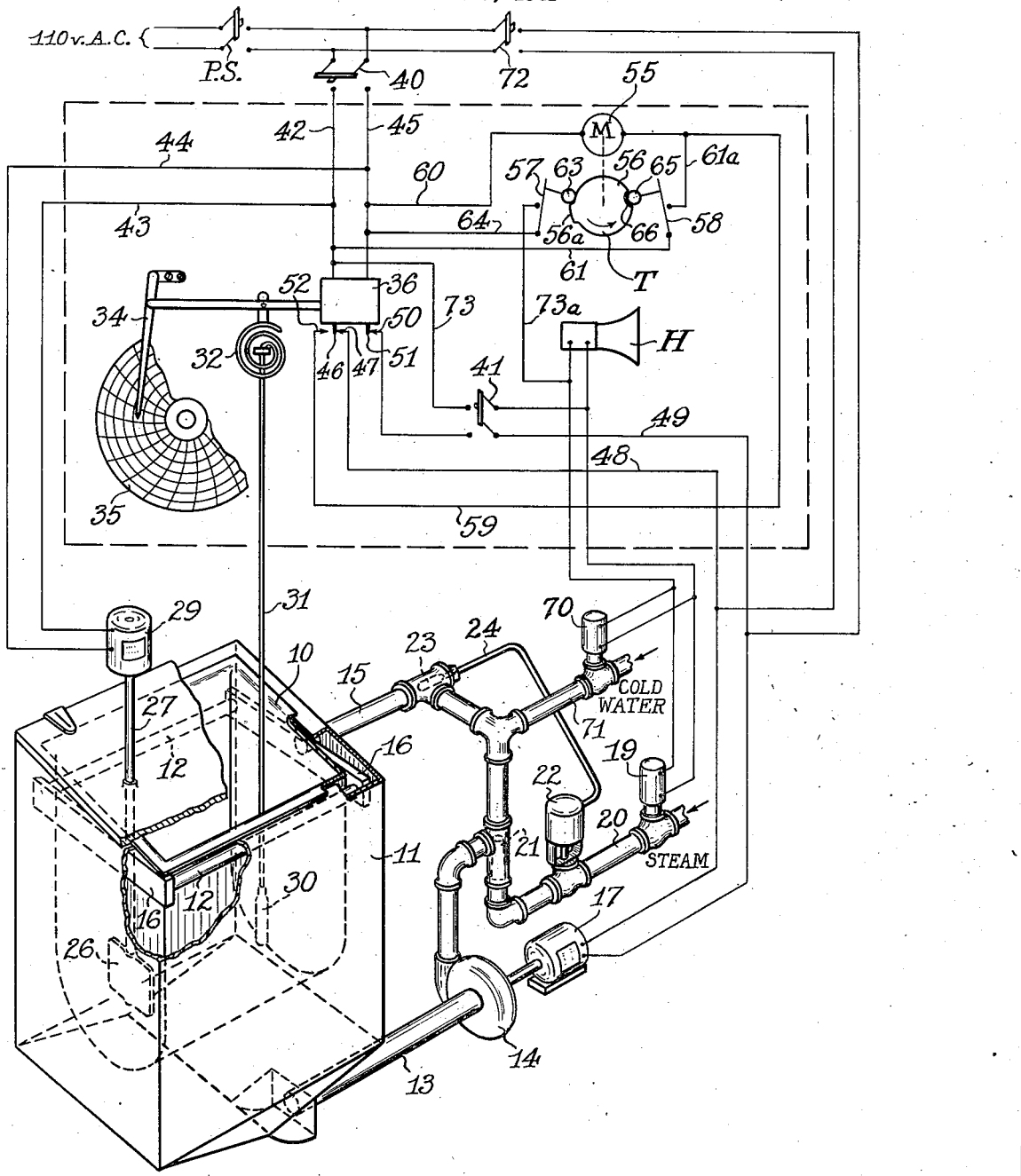
INVENTOR.
RAYMOND E. OLSON
BY D. Clyde Jones
ATTORNEY.

Patented June 8, 1943

2,321,235

UNITED STATES PATENT OFFICE 2,321,235

PASTEURIZING SYSTEM

Raymond E. Olson, Pittsford, N. Y., assignor to Taylor Instrument Companies, Rochester, N. Y., a corporation of New York Application March 7, 1941, Serial No. 382,137

4 Claims. (Cl. 236—18)

This invention relates to pasteurizing systems and more particularly to an improvement in discontinuous or batch pasteurizing systems of the type disclosed in the patent to Fielder No. 2,001,344, granted May 14, 1935.

In the use of such a batch pasteurizing system, it is a requirement of the health authorities that the milk be held at a prescribed pasteurizing temperature for a predetermined period. However, it is desirable that the heating of the milk be discontinued as soon as this period has transpired. The present invention has for its purpose to provide an arrangement which ensures that the milk will be heated for the required period, while the heating will be discontinued at the end of the given period, and yet the parts of the system are so arranged that an attendant cannot fail to operate the system in the proper manner.

The various features and advantages of the invention will appear from the detailed description and claims when taken with the drawing which is, in part, a perspective view of a spray vat pasteurizer with portions thereof broken away for clearness in disclosure and, in part, a diagrammatic showing of the remainder of the control system.

In the drawing, there is disclosed a pasteurizing vat including a receptacle 10 of suitable heat-conducting material, which is adapted to hold a batch of milk or other liquid to be heated. This receptacle is enclosed by an insulated jacket 11 spaced therefrom. The liquid in the receptacle 10 is arranged to be heated by hot water discharged from the pipe 12 against the outside walls of the receptacle. It will be understood that the water discharged from these pipes flows in films down the walls of the receptacle and accumulates in the bottom of the jacket 11 from which it is withdrawn through a pipe 13 by a suitable water-circulating pump 14. This circulating pump 14 returns the water through the main discharge conduit 15 and branch conduits 16 to the spray pipes 12.

The water-circulating pump 14 is preferably driven by a constant speed electric motor 17 so that the volume of the water being circulated is maintained substantially constant. The circulating water is heated to suitable temperature to impart a required or pasteurizing temperature to the milk. For this purpose, steam is supplied through the normally open solenoid valve 19, steam pipe 20 and the injector 21, into the water circulating pipe 15. A temperature regulating valve 22 controls the flow of steam through the pipe 20. This valve is actuated by a fluid-filled thermosensitive tube system comprising a bulb 23 projecting into the circulating water, and a pressure responsive unit (not shown), but enclosed in the motor top of the valve 22. In order to ensure that the temperature of the milk will be uniform at all points in the receptacle, there projects therein an agitator 26, the shaft 27 of which is driven by an electric motor 29.

In the present pasteurizing system, the heating water is circulated only during those intervals of the holding period when the temperature of the milk is below the pasteurizing temperature. As disclosed in the mentioned Fielder patent, thermosensitive switching means controls the operation of the motor 17 which, in turn, drives the circulating pump 14. This thermosensitive switching means includes a fluid-filled tube system comprising a bulb 30 communicating through a capillary tube 31 with a hollow Bourdon spring 32. The Bourdon spring in responding to the rise or fall in temperature at the bulb 30, actuates a recording pen 34 which records this temperature on a chart 35, driven by a suitable clock motor (not shown). The Bourdon spring 32 also actuates an electrical switching device 36 of the so-called snap action type. The construction of the recorder and the means for actuating the switching contactors 46 and 51 of the electrical switching device may be similar to that disclosed in the patent to Widmer No. 2,111,690, granted March 22, 1938.

In accordance with the present invention, timing and indicating means are provided for indicating when the pasteurizing period has been completed. The indicating means includes a signal, such as a horn H so arranged that the attendant in stopping the operation of the horn must reset the system in condition for the next cycle of operation.

In the operation of the system it will be understood that a batch of milk to be pasteurized is introduced into the receptacle 10. The power switch PS in the main power leads and the manual switch 40 in the power leads 42 and 45 are closed and an additional manual switch 41 is also closed. On the closing of the manual switch PS and 40, a circuit is completed through conductors 42 and 43, agitator motor 29, conductor 44, to the other side of the power supply 45. Also with this manual switch closed, a circuit is completed for the circulating motor 17. This circuit includes the power conductor 42, contactor 46 of the snap action type switch 36, and normally closed contact 47, conductor 48, winding of the motor 17, conductor 49, lower blade of manual switch 41, contact 50 and contactor 51 to the other side 45 of the power source. Thus the motor 17 will drive the circulating pump 14 so that the water will be continuously sprayed against both sides of the receptacle 10 and at the same time the agitator motor 29 will drive the agitator 26 to stir up the milk. These operations continue until the milk in the receptacle reaches the prescribed pasteurizing temperature, for example, 145° F., at which time contactors 46 and 51 of the snap-acting switch 36 will disengage their respective contacts 47 and 50, but the contactor 46 snaps into engagement with the contact 52. It will be recalled that the snap-action switch 36 is tripped by the unwinding of the Bourdon spring 32, due to expansion of the thermosensitive fluid in the bulb 30 when the milk reaches the pasteurizing temperature. It will be noted that the circuit for the circulating motor 17 is now interrupted at the contact 50 so that the water ceases to circulate. However, if the temperature of the milk drops below 145° F. during the holding interval, the contactors 46 and 51 will snap into engagement respectively with the contacts 47 and 50. The engagement of the contactor 51 with the contact 50 completes a circuit for the circulating motor 17, which motor will continue to circulate the water until the milk again reaches the pasteurizing temperature. It will be understood that the motor 17 may stop and start several times during the pasteurizing period.

As soon as the milk or other liquid in the receptacle 10 reaches the pasteurizing temperature, it is desirable to start measuring the holding interval. In the present arrangement it is assumed that the milk will be held in the receptacle 10 for an interval of thirty and one-half minutes. In order to measure this interval there is provided a timing device T, including a third motor 55, the shaft of which drives a cam 56 to actuate the switching contacts 57 and 58. The timing device has a definite normal position as shown, to which position it rotates and comes to a stop at the conclusion of each time cycle. As soon as the milk in the receptacle reaches the pasteurizing temperature, the contactor 46 snaps into engagement with the contactor 52 as previously mentioned. This closes a circuit from conductor 42, contactor 46, contact 52, conductor 59, winding of the motor 55, conductors 60 and 45 to the other side of the alternating current source. On completion of the mentioned circuit, the motor 55 rotates the cam 56, but when this cam rotates from the normal position shown, it closes the contacts of switch 58. The closure of these contacts completes a substitute circuit for the timer motor which circuit is independent of the control of the contactor 46 and contact 52 of the snap-acting switch. This substitute circuit for the timing motor extends from the power lead 42, conductor 61, switch contacts 58, conductor 61a, winding of the motor 55, conductors 60 and 45, to the other side of the current source. Thus the timing device continues to rotate until the pasteurizing period, namely, thirty-and-one-half minutes, has been measured. At the conclusion of this period, the follower 63 engages the rise on the high point 56a on the cam 56 to close the switch contacts 57. On the closure of these contacts, a circuit is completed for the horn H or other indicating device, as well as for the solenoid valves 19 and 70. The circuit for this indicating device is traceable from the conductors 42 and 73, upper blade of manual switch 41, winding of horn H, conductors 73a, switch contacts 57, conductors 64 and 45, to the other side of the current source. It will be noted that the solenoid valves 19 and 70 are connected in multiple with the winding of the horn in the last described circuit. The operation of the normally closed solenoid valve 70 introduces cooling water through the pipe 71 into the water-circulating system, while the operation of the normally open solenoid valve 19 stops the flow of steam through pipe 20. When the horn starts to sound, the attendant is thereby advised that the pasteurizing period has been completed so that he will open the manual switch 41. The opening of this switch interrupts the multiple circuit of horn winding together with solenoid valves 19 and 70, as well as the circuit of the circulating motor 17.

The interruption of this circuit causes the solenoid valve 70 to close the cold water supply pipe 71 and causes the solenoid valve 19 to open the steam supply pipe 20, as well as causes the motor 17 to stop the operation of the pump so that no more heat will be introduced into the milk in the receptacle 10. It will be appreciated that the manual switch 41 must again be closed before another batch of milk can be pasteurized. The timing device T is so arranged that, in addition to the thirty and one-half minute pasteurizing interval it will measure a second interval, for example, five minutes, in which the receptacle 10 can be rinsed or sterilized in readiness for a succeeding batch of milk. The switch contacts 58 of the timing device ensure that the cam 56 will rotate to the normal position illustrated in Fig. 1, in which position the cam follower 65 drops into the low dwell 66 of the cam to open the switch contacts 58.

As herein illustrated, an additional circuit closed by the switches PS and 72 enables the pump motor 17 to be operated under manual control independently of the automatic thermosensitive switching means.

I claim:

1. In a pasteurizing arrangement, a vat for holding a liquid to be pasteurized, means including a pump for recirculating a heating medium in heat exchange relation to said liquid for heating the same, an electric motor for operating said recirculating pump, a thermosensitive switching device responsive to a predetermined temperature of said liquid, a circuit for said motor completed through said switching device only when said liquid is below said predetermined temperature, a timing device including a second motor for measuring a predetermined time interval, an initial circuit for said timing motor completed by said switching device when said liquid reaches said predetermined temperature, a substitute circuit for said timing motor completed by said timing device when said initial circuit is completed, signalling means indicating the completion of said time interval, and a circuit for said signalling means completed by said timing device at the conclusion of the time interval.

2. In a pasteurizing arrangement, a vat for holding a liquid to be pasteurized, means including a pump for recirculating a heating medium in heat exchange relation to said liquid for heating the same, an electric motor for operating said recirculating pump, a thermosensitive switch responsive to a predetermined temperature of said liquid, a circuit for said motor completed through said switch only when said liquid is below said predetermined temperature, a timing device including a second motor for measuring a predetermined time interval, an initial circuit for said timing motor completed by said switch when said liquid reaches said predetermined temperature, a substitute circuit for said timing motor completed by said timing device when said initial circuit is completed to put the timing device in operation, signalling means indicating the completion of said time interval, a circuit for said signalling means completed by said timing device at the conclusion of the time interval, and a manual switch controlling said last-mentioned circuit as well as the circuit of said circulating motor.

3. In a pasteurizing arrangement, a vat for holding a liquid to be pasteurized, means including a pump for recirculating a liquid heating medium in heat exchange relation to said liquid for heating it, an electric motor for operating said recirculating pump, a thermosensitive switch responsive to a predetermined temperature of said liquid, said switch having normally closed and normally open contacts, a circuit for said motor completed through said normally closed contacts, a timing device including a second motor for measuring a predetermined time interval, said timing device having a normal position and including off-normal contacts closed when said device is away from its normal position, an initial circuit for said timing motor completed through said normally open contacts, a substitute circuit for said timing motor completed through said off-normal contacts, signalling means indicating the completion of said time interval, a circuit for said signalling means completed by said timing device at the conclusion of the interval, and a manual switch controlling said last-mentioned circuit as well as the circuit of said circulating motor.

4. In a pasteurizing arrangement, a vat for holding a liquid to be pasteurized, means including a pump for circulating and for spraying a liquid heating medium against the exterior of said vat to heat the liquid therein, an electric motor for operating said pump, thermosensitive switching means responsive to a predetermined temperature of said liquid, said switching means having normally closed and normally open contacts, a circuit for said motor completed through said normally closed contacts, a timing device including a second motor for measuring a predetermined time interval, said timing device having a normal position and including off-normal contacts closed when said device is away from its normal position, an initial circuit for said timing motor completed through said normally open contacts, a substitute circuit for said timing motor completed through said off-normal contacts, signalling means indicating the completion of said time interval, a circuit for said signalling means completed by said timing device at the conclusion of the interval, and a manual switch controlling said last-mentioned circuit as well as the circuit of said circulating motor.

RAYMOND E. OLSON.